US009785542B2

(12) United States Patent
Elston et al.

(10) Patent No.: US 9,785,542 B2
(45) Date of Patent: Oct. 10, 2017

(54) IMPLEMENTING EDIT AND UPDATE FUNCTIONALITY WITHIN A DEVELOPMENT ENVIRONMENT USED TO COMPILE TEST PLANS FOR AUTOMATED SEMICONDUCTOR DEVICE TESTING

(71) Applicant: Advantest Corporation, Tokyo (JP)

(72) Inventors: Mark Elston, Salinas, CA (US); Leon Chen, San Jose, CA (US); Harsanjeet Singh, Danville, CA (US); Hironori Maeda, Tatebayashi (JP); Ankan Pramanick, San Jose, CA (US); Youbi Katsu, Ota (JP)

(73) Assignee: ADVANTEST CORPORATION, Tokyo (JP)

( * ) Notice: Subject to any disclaimer, the term of this patent is extended or adjusted under 35 U.S.C. 154(b) by 288 days.

(21) Appl. No.: 13/864,191

(22) Filed: Apr. 16, 2013

(65) Prior Publication Data
US 2014/0310693 A1    Oct. 16, 2014

(51) Int. Cl.
G06F 9/44 (2006.01)
G06F 11/36 (2006.01)
G06F 11/22 (2006.01)

(52) U.S. Cl.
CPC .......... *G06F 11/3688* (2013.01); *G06F 11/22* (2013.01)

(58) Field of Classification Search
CPC .......................................................... G06F 9/44
USPC .................................................. 717/124–131
See application file for complete search history.

(56) References Cited

U.S. PATENT DOCUMENTS

| 5,313,387 | A  | * | 5/1994  | McKeeman et al. ........... 700/90 |
| 5,675,803 | A  |   | 10/1997 | Preisler et al. |
| 6,106,571 | A  | * | 8/2000  | Maxwell ....................... 717/131 |
| 6,182,258 | B1 | * | 1/2001  | Hollander ........ G01R 31/31704 |
|           |    |   |         | 714/739 |
| 6,836,884 | B1 |   | 12/2004 | Evans et al. |
| 7,100,152 | B1 | * | 8/2006  | Birum et al. ................. 717/131 |
| 7,353,427 | B2 | * | 4/2008  | Bates et al. ................ 714/38.12 |
| 7,363,617 | B2 | * | 4/2008  | Barsness et al. ............. 717/129 |
| 7,367,015 | B2 |   | 4/2008  | Evans et al. |
| 7,516,441 | B2 |   | 4/2009  | Hamilton et al. |
| 8,001,532 | B1 | * | 8/2011  | Jakubiak ............. G06F 11/3684 |
|           |    |   |         | 714/46 |
| 8,010,839 | B2 |   | 8/2011  | Shimura |
| 8,024,706 | B1 | * | 9/2011  | Krauss ................ G06F 11/3664 |
|           |    |   |         | 714/20 |

(Continued)

OTHER PUBLICATIONS

MSDN, Edit and Continue, 2005, Retrieved from http://msdn.microsoft.com/en-us/library/bcew296c(v=vs.80).aspx.

*Primary Examiner* — Jae Jeon

(57) ABSTRACT

A method for debugging test procedures for automated device testing is disclosed. The method comprises receiving a command to update at least one modified test procedure modified during a first debugging session and saving state information for a test plan, wherein the state information comprises information regarding a breakpoint entry location, and wherein the modified test procedure is invoked within the test plan. The method subsequently comprises suspending execution of the test plan and unloading the modified test procedure. It also comprises compiling the modified test procedure to produce a compiled file and then reloading the test procedure into the test plan using the compiled file. Finally, it comprises resuming execution of the modified test procedure in a second debugging session and breaking the execution during the second debugging session at a breakpoint corresponding to the breakpoint entry location.

21 Claims, 9 Drawing Sheets

(56) References Cited

U.S. PATENT DOCUMENTS

| | | | |
|---|---|---|---|
| 2003/0065731 A1* | 4/2003 | Mohammed | G06F 21/33 709/208 |
| 2003/0086536 A1* | 5/2003 | Salzberg | H04M 3/22 379/15.02 |
| 2005/0034109 A1* | 2/2005 | Hamilton | G06F 11/3664 717/140 |
| 2005/0039079 A1 | 2/2005 | Higashi et al. | |
| 2005/0120274 A1 | 6/2005 | Haghighat et al. | |
| 2005/0154551 A1* | 7/2005 | Pramanick | G01R 31/3183 702/119 |
| 2005/0251719 A1* | 11/2005 | Gerber | G06F 11/3696 714/742 |
| 2006/0195747 A1* | 8/2006 | Pramanick | G01R 31/31907 714/742 |
| 2006/0271322 A1* | 11/2006 | Haggerty | G06F 11/2273 702/108 |
| 2008/0126865 A1 | 5/2008 | Lee | |
| 2008/0295114 A1* | 11/2008 | Argade et al. | 719/320 |
| 2009/0119054 A1* | 5/2009 | Adachi | G01R 31/31907 702/119 |
| 2009/0204849 A1* | 8/2009 | Shimura | G06F 11/263 714/27 |
| 2009/0313611 A1* | 12/2009 | Panchamukhi et al. | 717/129 |
| 2012/0089964 A1* | 4/2012 | Sawano | G06F 11/3684 717/124 |
| 2013/0019228 A1* | 1/2013 | Bates | G06F 8/70 717/129 |

\* cited by examiner

IMPLEMENTING EDIT AND UPDATE FUNCTIONALITY WITHIN A DEVELOPMENT ENVIRONMENT USED TO COMPILE TEST PLANS FOR AUTOMATED SEMICONDUCTOR DEVICE TESTING

FIELD OF THE INVENTION

Embodiments of the present invention relate generally to automated device testing and more specifically to a user-friendly and efficient method and system for debugging test procedures for automated device testing.

BACKGROUND OF THE INVENTION

Automated test equipment (ATE) can be any testing assembly that performs a test on a device, semiconductor wafer or die, etc. ATE assemblies may be used to execute automated tests that quickly perform measurements and generate test results that can then be analyzed. An ATE assembly may be anything from a computer system coupled to a meter, to a complicated automated test assembly that may include a custom, dedicated computer control system and many different test instruments that are capable of automatically testing electronics parts and/or semiconductor. Automatic Test Equipment (ATE) is commonly used within the field of electrical chip manufacturing. ATE systems both reduce the amount of time spent on testing devices to ensure that the device functions as designed and serve as a diagnostic tool to determine the presence of faulty components within a given device before it reaches the consumer.

In testing devices or products, e.g. after production, it is crucial to achieve among others a high product quality, an estimation of the device or product performance, a feedback concerning the manufacturing process and finally a high customer contentment. Usually a plurality of tests is performed in order to ensure the correct function of a device or product. Because the testing process is expensive, in addition to ensuring performance of the devices, it is also important to maximize testing speed and throughput.

A test plan or test program comprises all user-defined data and control flows that are necessary to perform a semiconductor device test on an ATE system. More specifically, a test plan is a program where test conditions which satisfy device specifications, combinations of test conditions and test algorithms, and a test flow are described in the language of the tester software. The main control flow in a test program, which dictates the sequence of individual tests to be applied to the DUTs, and the order in which the tests will be applied (which is dependent on the results of individual tests), is referred to as the test program flow.

When a test program is written for a DUT, in general a predominant part of the program is "data" for device test, and the rest is the program code, which realizes the test methodology itself. The data is DUT-dependent (e.g., power supply conditions, signal voltage conditions, timing conditions, etc.). The test code may consist of methods to load the specified device conditions on to tester hardware, and also those needed to realize the user specified objectives such as data-logging, etc. The ATE framework can also provide a hardware-independent test and tester object model that allows the user to perform the task of DUT test programming.

Since test methodology is a significant component in device test quality and tester productivity, it is often encapsulated from the end users. This separation results in safer operation of the system. Further, to increase the reusability of test code, such code should be independent of any device-specific data, e.g., pin name, stimulus data, etc. or device-test-specific data, e.g., conditions for DC units, measurement pins, number of target pins, name of pattern file, addresses of pattern programs, etc. If code for a test is compiled with data of these types, the reusability of the test code would decrease. Therefore, any device-specific data or device-test-specific data should be made available to the test code externally as inputs during code execution time.

In conventional ATE tester software, a "test class," realizes the separation of test data and code (and, hence, the reusability of code) for a particular type of test. Such a test class could be regarded as a "template" for separate instances of a test, which differ from each other only on the basis of device-specific and/or device-test-specific data. Test classes are typically specified in the test plan file. Each test class typically implements a specific type of device test or setup for device test. For example, the tester software can provide sample test classes to implement functional tests, AC parametric tests, and DC parametric tests. Accordingly, a test class is the template for a test. Device-dependent test conditions are not described in the test class itself. Only an algorithm for executing tests using the test system is described.

Test classes allow the user to configure class behavior by providing parameters that are used to specify the options for a particular instance of that test. For example, a test class for implementing a functional test may provide parameters to specify a test pattern to execute on the DUTs being tested. Also it may provide parameters to specify the level and timing conditions for the test. Specifying different values for these parameters allows the user to create different instances of the functional test. In one embodiment, test classes are developed in a conventional programming language such as C++.

A tester software system such as Advantest Corporation's T2000 System Software, typically comprises a compiler, which compiles test plans written in the programming language of the tester system, e.g. OPENSTAR Test Programming Language ("OTPL"). OTPL can be used to describe test execution sequence and the corresponding test conditions used. While OTPL can describe a test plan, it typically does not describe any test algorithm. The test algorithm in a system such as T2000, for example, can be described using the C++ language in a test class as discussed above.

Most users of an ATE use a development environment, e.g. Microsoft Developers Studio ("MDS") to prepare their test classes. Typically, the users will be provided with plug-ins from the developers of the tester software system so they can edit and create test plans within the same environment. Thus, users are able to write out test classes and test plans and carry out debugging from within the development environment of their choice. A development environment such as MDS can typically provide an "Edit and Continue" feature for debugging projects. "Edit and continue" is a time-saving feature that enables a user to make changes to the source code while the program is in break mode. When the execution of the program is resumed by choosing an execution command such as "continue" or "step," the edit and continue" operation automatically applies the code changes with certain limitations. This allows the user to make changes to the code during a debugging session, instead of having to stop, recompile the entire program, and restart the debugging session.

The "edit and continue" feature available in typical development environments, e.g., MDS, have several limitations, however, that restrict a user's ability to fully take advantage of the feature. First, it cannot be used in connection with all types of code. For example, it cannot be used in a debugging environment when debugging 64-bit code. As a result, many users of tester software that develop 64-bit test classes and test plans for performance reasons are unable to take advantage of this feature.

More importantly, the conventional "edit and continue" feature has various limitations on the type of code changes allowed. For example, one drawback is that conventional development environments only allow relatively minor code changes to be made when using the feature. Typically, the altered code section is recompiled, and a small portion of executing memory corresponding to the altered code is swapped out and replaced with a new block of memory generated using the new code. Thereafter, the appropriate instruction pointers are set accordingly.

The feature, as designed in conventional systems, is not able to handle any intricate code alterations that would require anything more complex than making a minor change in the code, e.g. syntactical changes, which would alter only a relatively small section of loaded memory. As a result, it is not very useful for developers of test classes for ATE. If users make any substantial error in the preparation of the test class or need to replace a test class for any other reason while a test plan is executing, they typically have to stop the test plan and unload it first. Subsequently, the developers need to edit, recompile, and relink the test class. Then, they need to reload the test plan and restart it from the beginning before getting back to the original point in the code. Such a work flow is time-consuming and error-prone.

BRIEF SUMMARY OF THE INVENTION

Accordingly, what is needed is an automated method and system to allow users to make changes to test classes during execution of a test plan without needing to manually perform all the steps that are currently required when making a change to test classes during debugging, such as unloading and reloading the entire test plan. This allows developers to prepare and debug test classes in a significantly more efficient and less error-prone manner than they were allowed to using conventional systems.

In order to accomplish this objective, embodiments of the present invention provide edit and update functionality within tester software systems. While debugging, a user may set a breakpoint in the test class source code causing the system to stop. The user can edit the source code, thereby initiating an edit and update session. The state information is then stored and the edited test classes are unloaded. Subsequently, the edit and update procedure will recompile the edited version of the test class and swap the original version with the newly compiled version. The edited test class is then re-executed and automatically stepped back to the same breakpoint as where the user left off debugging and the previously stored state information is restored. The test plan can then continue with the newly edited code.

A method for debugging test procedures for automated device testing is disclosed. The method comprises receiving a command to update at least one modified test procedure modified during a first debugging session and saving state information for a test plan, wherein the state information comprises information regarding a breakpoint entry location, and wherein the modified test procedure is invoked within the test plan. The method subsequently comprises suspending execution of the test plan and unloading the modified test procedure. It also comprises compiling the modified test procedure to produce a compiled file and then reloading the test procedure into the test plan using the compiled file. Finally, it comprises resuming execution of the modified test procedure in a second debugging session and breaking the execution during the second debugging session at a breakpoint corresponding to the breakpoint entry location, thereby, restoring the state information saved earlier.

In another embodiment, a computer-readable storage medium is disclosed. The computer-readable storage medium has stored thereon, computer executable instructions that, if executed by a computer system cause the computer system to perform a method for debugging test procedures for automated device testing. This method comprises receiving a command to update at least one modified test procedure modified during a first debugging session and saving state information for a test plan, wherein the state information comprises information regarding a breakpoint entry location, and wherein the modified test procedure is invoked within the test plan. The method subsequently comprises suspending execution of the test plan and unloading the modified test procedure. It also comprises compiling the modified test procedure to produce a compiled file and then reloading the test procedure into the test plan using the compiled file. Finally, it comprises resuming execution of the modified test procedure in a second debugging session and breaking the execution during the second debugging session at a breakpoint corresponding to the breakpoint entry location, thereby, restoring the state information saved earlier.

In another embodiment, a system for debugging test procedures for automated device testing is disclosed. The system comprises a memory comprising a development environment stored therein, wherein the development environment is operable to debug a test program, and wherein the development environment comprises a debugger. The system also comprises a processor coupled to the memory, the processor being configured to operate in accordance with the development environment to: (a) save state information for a test plan, wherein the state information comprises information regarding a breakpoint entry location, and wherein a modified test procedure is invoked within the test plan; (b) suspend execution of the test plan; (c) unload the modified test procedure from the test plan; (d) compile the modified test procedure, wherein the compile generates a compiled file associated with the modified test procedure; (e) reload the modified test procedure into the test plan using the compiled file; (f) resume execution of the modified test procedure in a debugging session; and (g) breaking the execution during the debugging session at a breakpoint corresponding to the breakpoint entry location. The state information saved earlier is subsequently restored.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
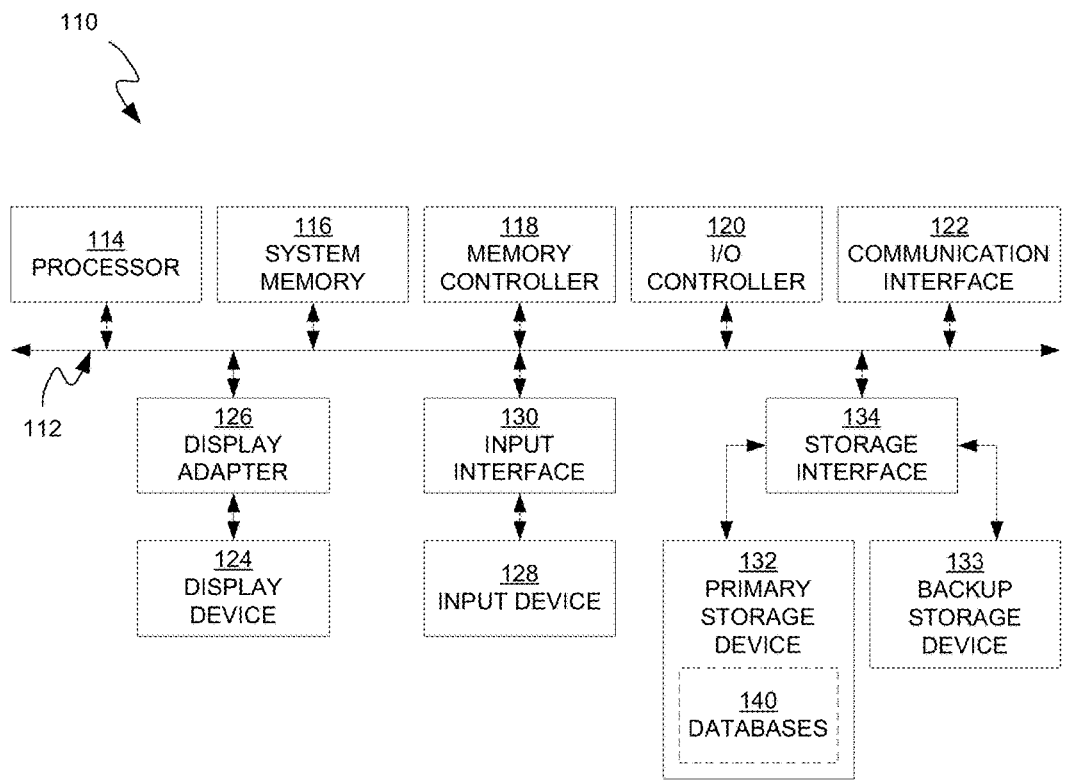
FIG. 1 is an exemplary computer system on which embodiments of the automated test system of the present invention can be implemented in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "saving," "suspending," "unloading," "compiling," "reloading," "resuming," "associating," "executing," "removing," "releasing," "reserving," "setting," "accessing," "freeing," "controlling," "adding," "determining," "identifying" or the like, refer to actions and processes (e.g., flowchart 900 of FIG. 9) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 for a system controller capable of implementing embodiments of the present disclosure. For example, computing system 110, in one embodiment, could implement the controller of the tester system. Computing system 110 broadly represents any single or multi-processor computing device or system capable of executing computer-readable instructions. Examples of computing system 110 include, without limitation, workstations, laptops, client-side terminals, servers, distributed computing systems, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for running test plans may be stored on the computer-readable medium and then stored in system memory 116 and/or various portions of storage devices 132 and 133. When executed by the processor 114, the computer program may cause the processor 114 to perform and/or be a means for performing the functions required for sharing resources between multiple test cores in a concurrent test environment.

Implementing Edit and Update Functionality within a Development Environment Used to Compile Test Plans for Automated Semiconductor Device Testing The conventional edit and continue functionality found in some development environments has various limitations. First, it cannot be used in connection with all types of code. For example, it cannot be used in a debugging environment when debugging 64-bit code. As a result, many users of tester software that develop 64-bit test classes and test plans for performance reasons are unable to take advantage of this feature.

Second, there are limitations on the type of code changes allowed. For example, one drawback is that conventional development environments only allow relatively minor code changes to be made when using the feature. Typically, the altered code section is recompiled, and a small portion of executing memory corresponding to the altered code is swapped out and replaced with a new block of memory generated using the new code. Thereafter, the appropriate instruction pointers are set accordingly.

The feature, as designed in conventional systems, is not able to handle any intricate code alterations. As a result, it is not very useful for developers of test classes for ATE. If users make a substantial error in the preparation of the test class or need to replace a test class for any other reason while a test plan is executing, they typically have to stop the test plan and unload it first. Then, they would need to reload the test plan and restart it from the beginning before getting back to the original point in the code. Such a work flow is time-consuming and error-prone.

Accordingly, the embodiments of the present invention provide an automated method and system to allow users to make changes to test classes during execution of the test plan without needing to manually perform all the above discussed steps. This allows developers to prepare and debug test classes in a significantly more efficient and less error-prone manner than they were allowed to using conventional systems.

In order to accomplish this objective, embodiments of the present invention provide edit and update functionality within tester software systems. While debugging, a user may set a breakpoint in the test class source code causing the system to stop. The user can edit the source code, thereby initiating an edit and update session. The state information is then stored and the edited test classes are unloaded. Subsequently, the edit and update procedure will recompile the edited version of the test class and swap the original version with the newly compiled version. The edited test class is then re-executed and automatically stepped back to the same breakpoint as where the user left off debugging and the previously stored state information is restored. The test plan can then continue with the newly edited code.

Using embodiments of the present invention, developers can make substantial changes to the test classes and are not limited to only implementing minor edits. In fact, one embodiment of the present invention supports changing the entire test class file instead of only a minor section of the file.

Figure 2A:
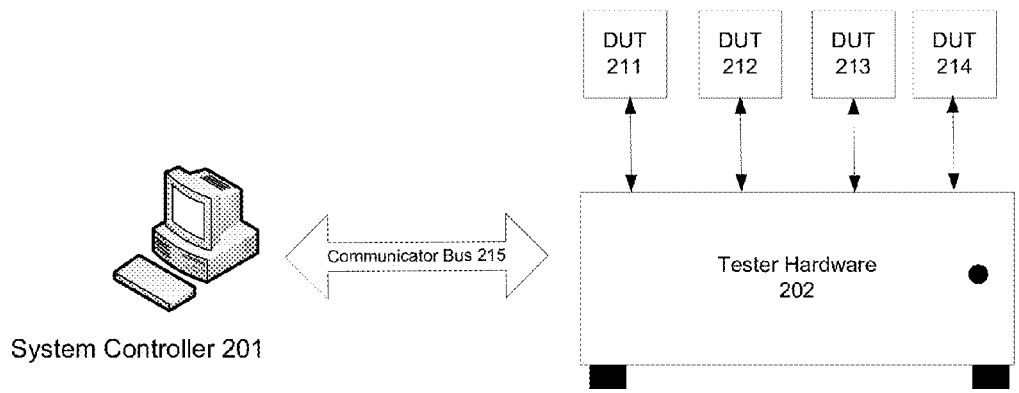
FIG. 2A is a schematic block diagram for an exemplary automated test equipment apparatus on which embodiments of the present invention can be implemented in accordance with one embodiment of the present invention.

FIG. 2A is a schematic block diagram for an automated test equipment (ATE) apparatus on which embodiments of the edit and update procedure can be implemented in accordance with one embodiment of the present invention. In one embodiment, the system controller 201 comprises one or more linked computers. For example, testing systems such as Advantest Corporation's T2000 tester family, can use a network of computers. In other embodiments, the system controller often comprises only a single computer. The system controller 201 is the overall system control unit, and runs the software for the ATE that is responsible for accomplishing all the user-level testing tasks, including running the user's main test plan. One example of such tester software is the T2000 System Software. Typically, tester software such as the T2000 comprises a compiler, which compiles test plans written in the programming language of the tester system, e.g. OPENSTAR Test Programming Language ("OTPL").

The communicator bus 215 provides a high-speed electronic communication channel between the system controller and the tester hardware. The communicator bus can also be referred to as a backplane, a module connection enabler, or system bus. Physically, communicator bus 215 is a fast, high-bandwidth duplex connection bus that can be electrical, optical, etc. In one embodiment, communicator bus 215 can use the TCP/IP protocol. System controller 201 sets up the conditions for testing the DUTs 211-214 by programming the tester hardware through commands sent over the communicator bus 215.

Tester hardware 202 comprises the complex set of electronic and electrical parts and connectors necessary to provide the test stimulus to the devices under test (DUTs) 211-214 and measure the response of the DUTs to the stimulus, and compare it against the expected response.

Figure 2B:
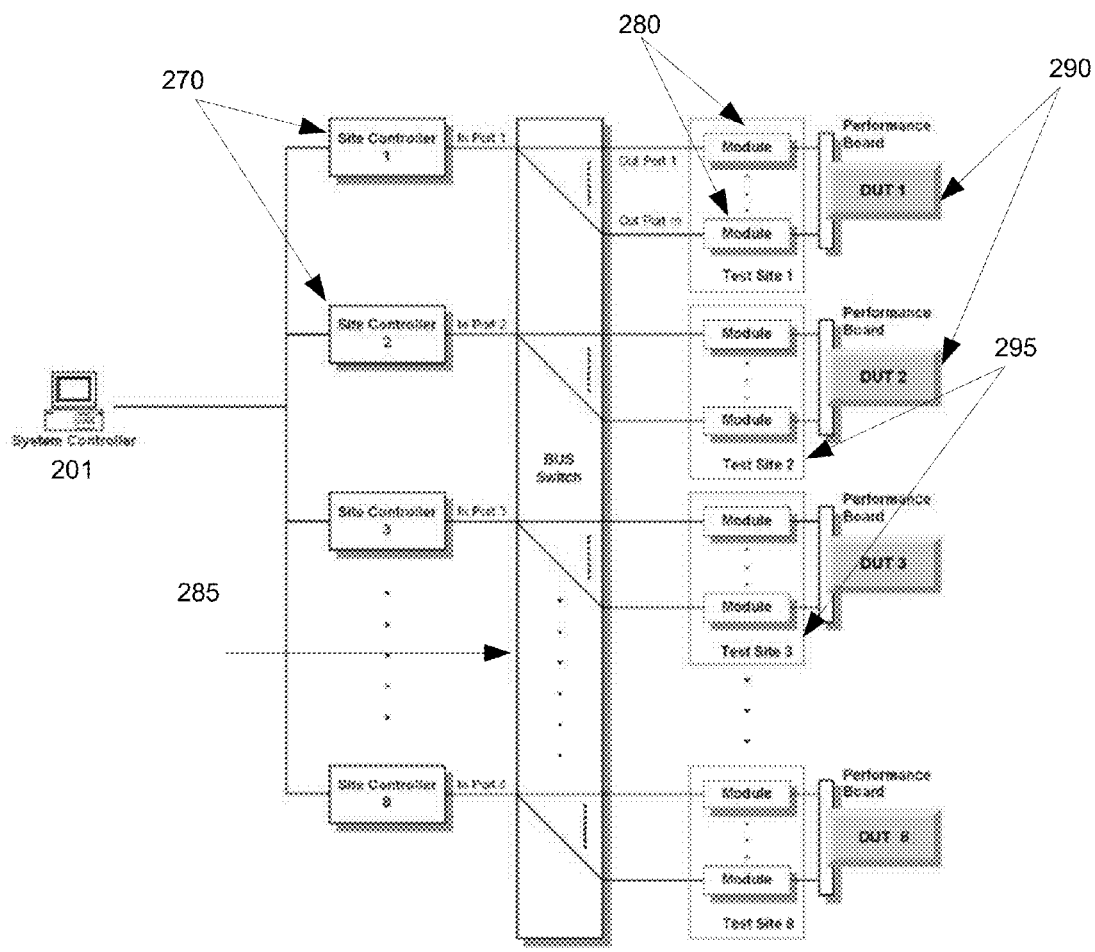
FIG. 2B is a more detailed schematic block diagram of one embodiment of the automated test equipment apparatus of FIG. 2A.

FIG. 2B is a more detailed schematic block diagram of one embodiment of the automated test equipment apparatus of FIG. 2A. In the embodiment illustrated in FIG. 2B, tester hardware 202 can comprise multiple site controllers 270, wherein each site controller is connected to multiple DUTs. Each site controller is a computer used in a device test. A test plan program can be executed on a site controller, which controls test modules 280 in the course of performing device tests for DUTs 290. The site controllers 270 are connected to the system controller, which controls the site controllers over communicator bus 215. In some embodiments, test developers cannot directly operate the site controllers but instead operations performed by the developer are processed on the system controller 201, which controls the site controllers via communicator bus 215.

Site controllers 270 and test modules 280, in one embodiment, can be connected via high-speed optical buses. The bus switch 285 has a matrix structure for connecting the site controllers with the test modules. Using the bus switch 285 allows a site controller to connect with any test modules 280, and allows flexibility in configuring bus connections.

Test modules 280 required for device test are typically mounted in the test system test head. Test module configuration can be adapted to the targeted device. A set of test modules 280 required for device test is called a test site. Each test site 295 is controlled by a site controller. There can be various types of test modules for many applications. Some exemplary types of modules are sync-generator module, sync-matrix module, device power supply module, analog module, RF module and digital module.

Figure 3:
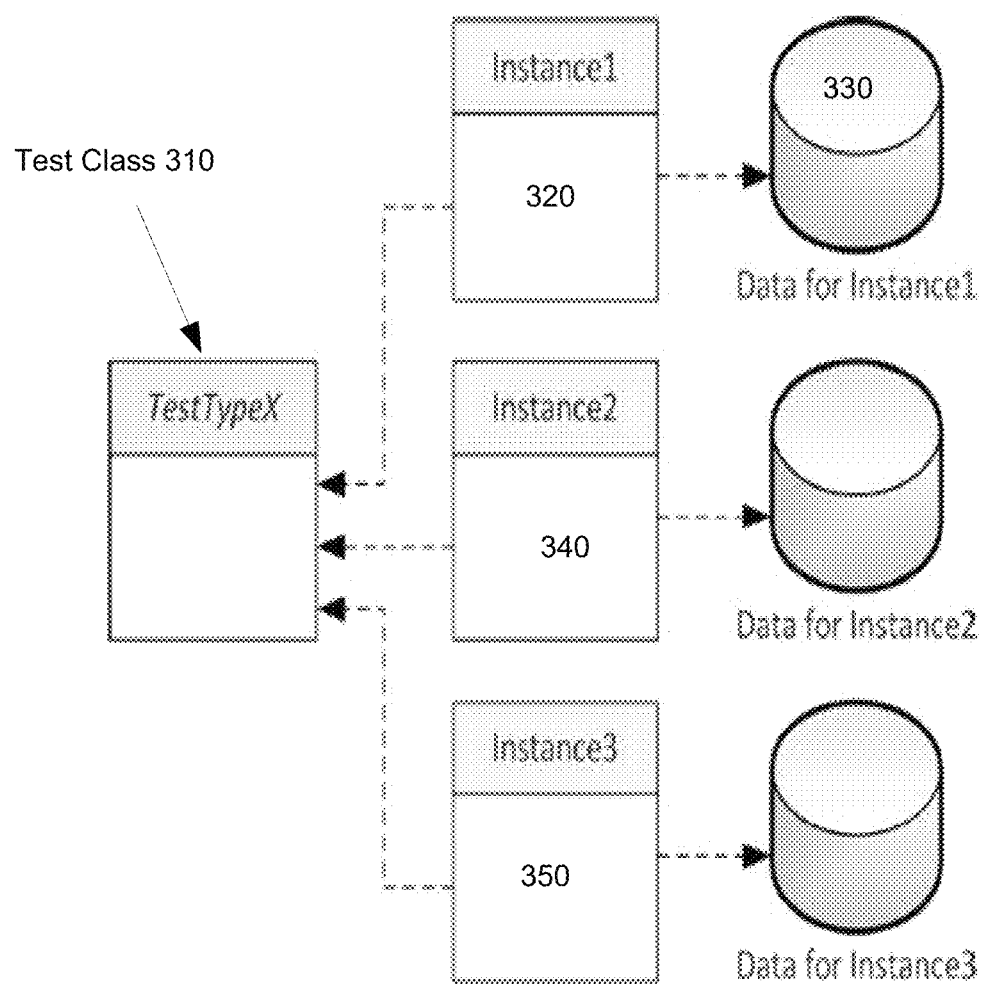
FIG. 3 illustrates a diagram regarding the manner in which different test instances can be created from a single test class.

FIG. 3 illustrates a diagram regarding the manner in which different test instances can be created from a single test class. As discussed in detail above, test classes allow the user to configure class behavior by providing parameters that are used to specify the options for a particular instance of that test. For example, a test class for implementing a functional test may provide parameters to specify a test pattern to execute on the DUTs being tested. Also it may provide parameters to specify the level and timing conditions for the test. Specifying different values for these parameters allows the user to create different instances of the functional test.

In a tester software system such as T2000, a test plan can be described in a test programming language such as OTPL, as discussed above. OTPL can be used to describe test execution sequence and the corresponding test conditions used. While OTPL can describe a test plan, it typically does not describe any test algorithm. The test algorithm in a system such as T2000, for example, can be described using the C++ language in a test class as discussed above.

While the discussion of the invention is in the context of the T2000 tester software, wherein test plans are developed using OTPL and test classes are developed using C++, the present invention is not limited to this embodiment. Other types of tester software using different programming languages may be employed in other embodiments. It will be understood to one of ordinary skill in the art that the teachings of the present invention can cover alternatives, modifications and equivalents, which may be included within the spirit and scope of the disclosure as defined by the appended claims.

In the example from FIG. 3, test class 310 can be used to create three separate instances of the test "TestTypeX." Each of the three instances, Instance1 320, Instance2 340, and Instance3 350, receives a separate set of parameter data for each instance of the test. For example, Instance1 320 receives parameter data 330, while the remaining instances receive their own set of parameters.

Figure 4:
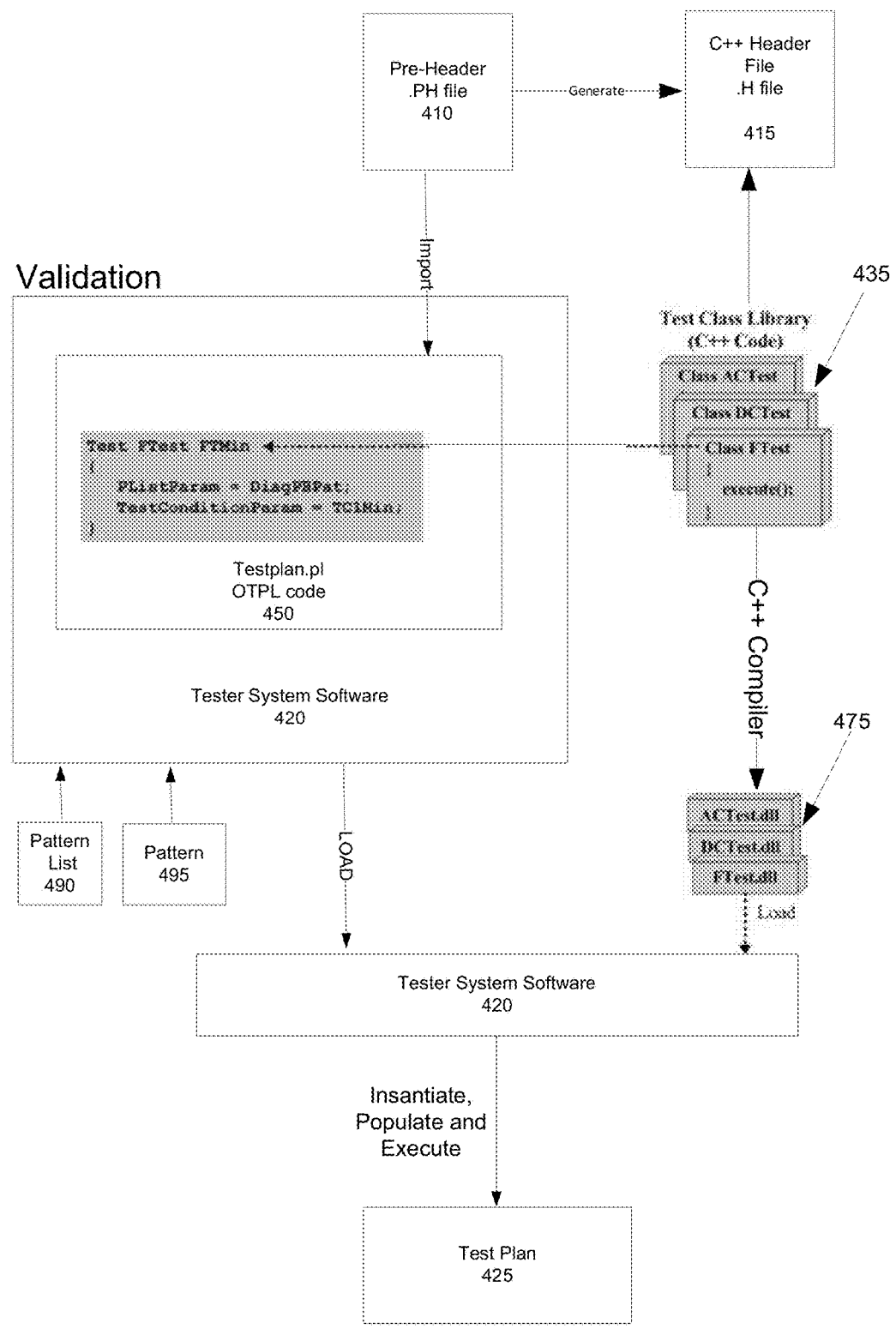
FIG. 4 is a block diagram of an exemplary software process illustrating the validation and execution of test classes within a test plan.

FIG. 4 is a schematic block diagram of an exemplary software process illustrating the validation and execution of test classes within a test plan.

In one embodiment, the user enters in all the information regarding the requisite parameters for the various test classes and other general properties into the pre-header file 410. The information regarding the parameters may comprise the names of the parameters, their allowed values, their types etc.

In conventional tester systems, the tester system software can provide a mechanism for verifying that the appropriate parameters are available for inclusion in the generated source code. The tester system software provides a method that allows the test class developer to fully specify, in a text-based source file per test class, the public methods and attributes of the test class that the developer has designated are the ones required to parameterize the class. Specifying its methods and attributes in a text file allows the tester software to easily determine if the appropriate parameters are available, which facilitates the error checking and validation of the test plan during the translation phase. In conventional ATE systems, this text-based description is embedded in a pre-header file for the test class, which is used by the compiler in the tester software to determine the methods and attributes of the test class. Further, it is used by the compiler for generating the header for the test class. In one embodiment, the header for the test class, similar to the test class itself, may also be in a conventional programming language such as C++. The generated C++ header file is the one used to finally compile the test class C++ code.

As discussed, the pre-header file is used by the tester system software to automatically generate the test class declaration C++ header file 415 from the pre-header file directly. The generated C++ header file is the one used to finally compile the test class C++ code 435. The C++ test class code 435 is compiled into binary DLL files that can be loaded for execution in the tester system software 420.

During validation phase, the tester system software 420 (also referred to as "tester operating system") reads in and analyzes the test plan OTPL code 450 developed by the test plan author for errors. The pre-header file 410 is used by tester operating system 420 to describe the test classes and the parameters needed by the test classes. By describing the test classes, the pre-header file allows the tester system software 420 to validate that the proper parameters are being passed to the various instances of the test classes.

The OTPL code 450 then gets loaded into the tester system software 420 along with the binary DLL test class files 475. In one embodiment, after OTPL code 450 is validated, the test plan code 450 then instantiates the test classes and uses the information from the pre-header file 410 to determine the appropriate parameters for the test class instantiation. The tester operating system 420 can populate the parameters for the various test classes based on the information provided in the pre-header file 410. For example, in FIG. 4, the tester operating system may read in a pattern list 490 and a pattern 495 that may be used as parameters for certain test classes instantiated within the OTPL code 450. The test plan 425 is then executed by the tester system software 420.

Figure 5:
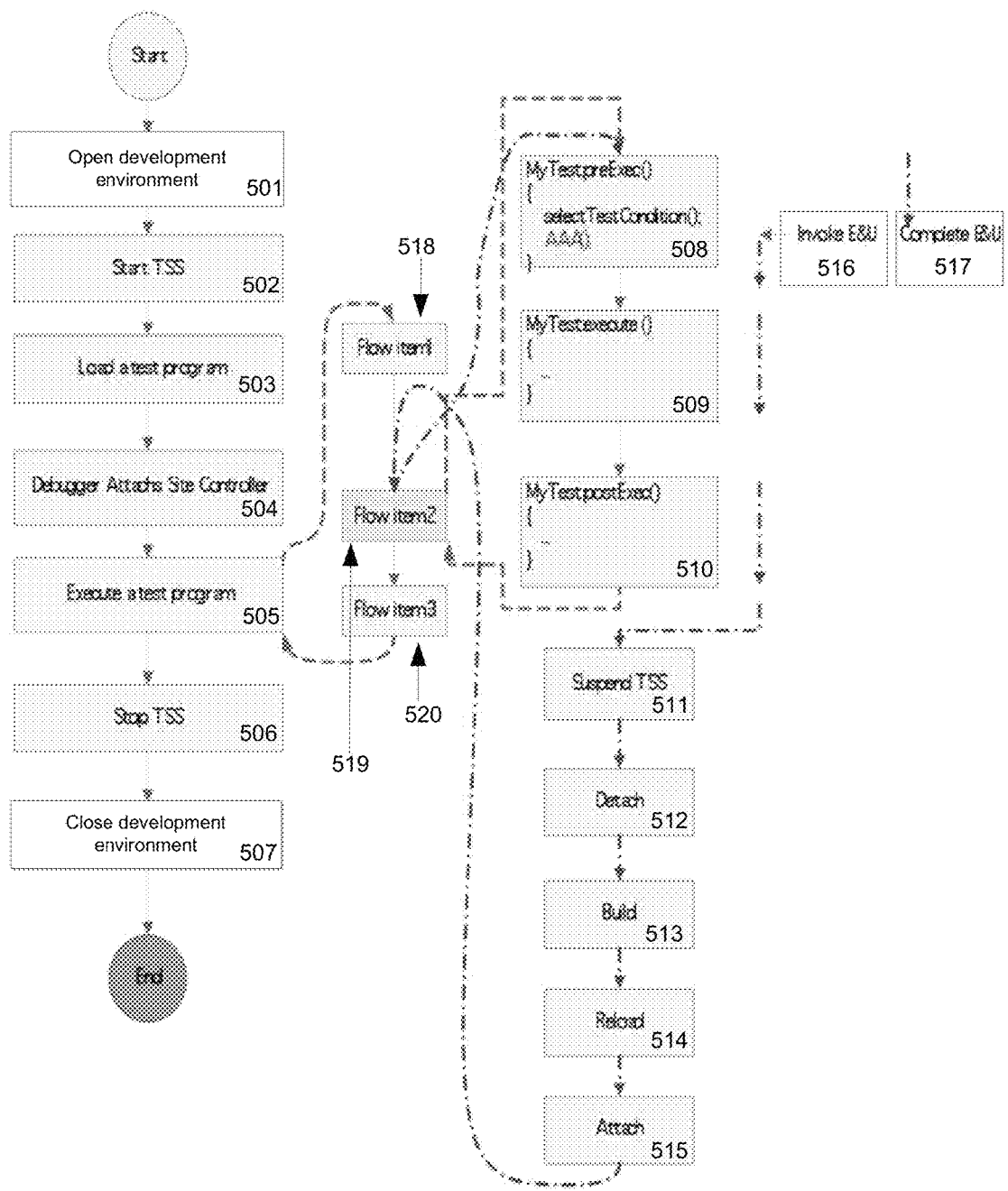
FIG. 5 is a block diagram of an exemplary software process illustrating an implementation of the edit and update functionality in accordance with one embodiment of the present invention.

FIG. 5 is a block diagram of an exemplary software process illustrating an implementation of the edit and update functionality in accordance with one embodiment of the present invention.

In one embodiment, at block 501, the user launches the develop environment, e.g. Visual Studio and loads a test class project that the user wants to debug using the application. At block 502, the user starts the tester system software ("TSS"). After TSS is started, the user loads a test plan or test program at 503. The user will then attach the debugger to the site controller, which may be connected to a DUT being tested, at block 504 to start the debugging session. The user also sets a breakpoint in a method of the test class that they want to debug. For example, the user could set a breakpoint in a method called "preExec( )", which is one of the methods comprising FlowItem2 519 as shown in block 508. Other exemplary methods comprising FlowItem 519 are "execute( )" and "postExec( )" at blocks 509 and 510 respectively.

The user will then execute the testflow at block 505. The first flow item, FlowItem1, at block 518 is executed first. However, during execution of the FlowItem2 at block 519, the debugger will break at the breakpoint in preExec( ) at block 508, and the source code may be visible in the code window of the debugging environment. At this point, the user may single step through the code until the user reaches a point where edits need to be made to the code. The user can make edits to the code in the same file or other files associated with the test class project. In one embodiment, instead of making edits, the user may also simply leave the debugger and continue execution.

If edits are made, then after completing the edits, the user may invoke the edit and update procedure at block 516. For example, the user may invoke the edit and update at method "AAA( )" inside preExec( ) when executing Flow item2. In one embodiment, when the edit and update procedure is invoked, the execution of the entire test class method being debugged, i.e., methods preExec( ), execute( ) and postExec( ) will be completed before the tester operating system is suspended at block 511. In another embodiment, the edit and update procedure may suspend right away without finishing execution of the remaining methods in the test flow item. In this embodiment, the user can immediately skip out of executing any remaining test class code and then suspend execution of the test plan to allow rebuilding and reloading of the test class.

In one embodiment, the edit and update procedure will keep track of the line at which it was invoked, so that it can return the user to the same line (hereinafter referred to as the "current line") after the test class has been updated and reloaded.

At block 512, the debugger is detached from the site controller it attached to in block 504. The site controllers 270 are typically where the test classes are executing. The system controller 201 is typically where the development environment runs. Accordingly, the user is typically implementing a remote debugging session from the system controller 201 on the site controller 270.

The debugger detaches from the site controller at block 512 and the effected test classes are unloaded. In the example of FIG. 5, any test class associated with FlowItem2 519 and any other class that inherits from it will need to be unloaded. This is because if the procedure is to alter memory with respect to an effected "base" class, it also needs to alter memory with respect to other "derived" classes that depend from the base test class. Accordingly, the edit and update procedure first needs to identify all the derived test classes. Next, the base test class and all derived test classes that depend on the base test class will be unloaded. Because the test classes are DLLs at this stage, they need to be unloaded before they can be edited and updated. Without unloading the effected test class DLLs, the test plan executable, which is in its suspended state, still has a handle on them, which precludes them from being written to.

At block 513, the edit and update procedure saves the source test class files modified in the code window of the development environment and then compiles the test class project to generate a new DLL. The new DLL is transmitted down from system controller 201 to site controller 270. In addition to the DLL for the base test class that was modified, DLLs for the derived test classes will also need to be generated and transmitted to the site controller 270.

If the test class project compiles successfully, the updated test class DLL will be reloaded back at step 514. Alternatively, in one embodiment, instead of generating an updated test class DLL from the edited test class file, a new version of the test class file may be created and compiled on the system controller 201 and, subsequently, transmitted down to the site controller 270, so it can be reloaded back into the TSS. Reloading the test class DLL comprises populating the test instances of the test class being debugged with the same test parameter values that were set originally using the new test class DLL. In addition, it also means populating the instances of all the derived test classes as well.

At block 515, the debugger is attached back to the same site controller that was being debugged in the prior debug session. The edit and update procedure, in one embodiment, will set a breakpoint at the "current line" at which the instruction pointer was paused when the edit and update procedure was initiated. In the example of FIG. 5, the breakpoint would be set at method AAA( ). Other breakpoints that were used in the previous debug session will be disabled temporarily so that the user can be returned to the current line in the code where the edit and update process was invoked instead of at an earlier breakpoint that may have been set. In different embodiments, other ways to control the breakpoints may be provided as the current line may have been removed while editing the test class. For example, the user could be returned to the closest line before the current line within the test class code. Or the user could be returned to the beginning of the function containing the current line.

Subsequently, the flow item, Flow item2, associated with the updated test class is re-executed by TSS and the execution will break within the debugger at the current line, i.e., at method AAA( ). The edit and update procedure will then restore all the temporarily disabled breakpoints that had been set by the user. Thereafter, the edit and update process ends at block 517. An edit and update session can typically be defined to last from the point of time the user selects the edit and update procedure to execute till the point of time when the debugged flow item is about to be re-executed from the point or close to the point at which the user left off when edit and update was invoked.

After the edit and update process ends, TSS resumes execution of the flow if the user chooses to continue execution. Accordingly, the user can choose to finish executing Flow item2 at block 519, and Flow item3 at block 520.

After the flow is finished executing, the user can choose to stop TSS at block 506 and shut down the development environment at block 507.

As discussed above, one of the advantages of the edit and update functionality is to allow users of the tester software system to edit their test class code and re-run their tests in the debugging environment without requiring the entire test plan to be reloaded and without burdening the user with manually going through a series of steps to accomplish test class modifications. Further, because the test class DLLs are unloaded, unlike the conventional "edit and continue" procedure, the user has the flexibility of making much more significant changes to the code of the test class, and in some cases even replacing the entire test class code.

Further, by allowing suspension of the test plan, the test classes can be unloaded and reloaded and the user can be returned to resume debugging the code at the same line in the code where the user had paused when she had started making edits and invoked the edit and update procedure. By comparison, a user who tried to update the test classes without using the edit and update procedure would need to cancel execution of the test plan completely to edit the test class. When execution of the test plan is cancelled, the user is returned to a ready state, which entails starting execution from the beginning of the test plan. Executing from the beginning of the test plan would be relatively cumbersome, especially in instances where the flow item the user updated was towards the end of the test plan. The edit and update procedure, on the other hand, allows the user to simply start at the beginning of the test class that was edited and return to the current line within the test flow item that the user was executing when the edit and update procedure was invoked.

Moreover, using the edit and update functionality advantageously ensures that the tester state is maintained, because the test plan is merely being suspended as opposed to cancelled. If a test plan is cancelled and execution needs to start from the beginning, the tester state may not be maintained if the system is not deterministic. For example, if a user is debugging a device, small changes in the device state during testing, e.g., heating up or cooling down of the device could cause the test to produce different results. Thus, a user may never actually get back to a particular flow item depending on how a DUT behaves during a test. Using the edit and update functionality avoids this problems because the user's location within the test plan never changes, the test plan merely suspends and the user is returned to the same location as before in the test plan after the test classes are reloaded back. As discussed above, the TSS provides users the ability to make modifications to test class code in the middle of a debugging session and continue testing the device without unloading the test plan.

Figure 6:
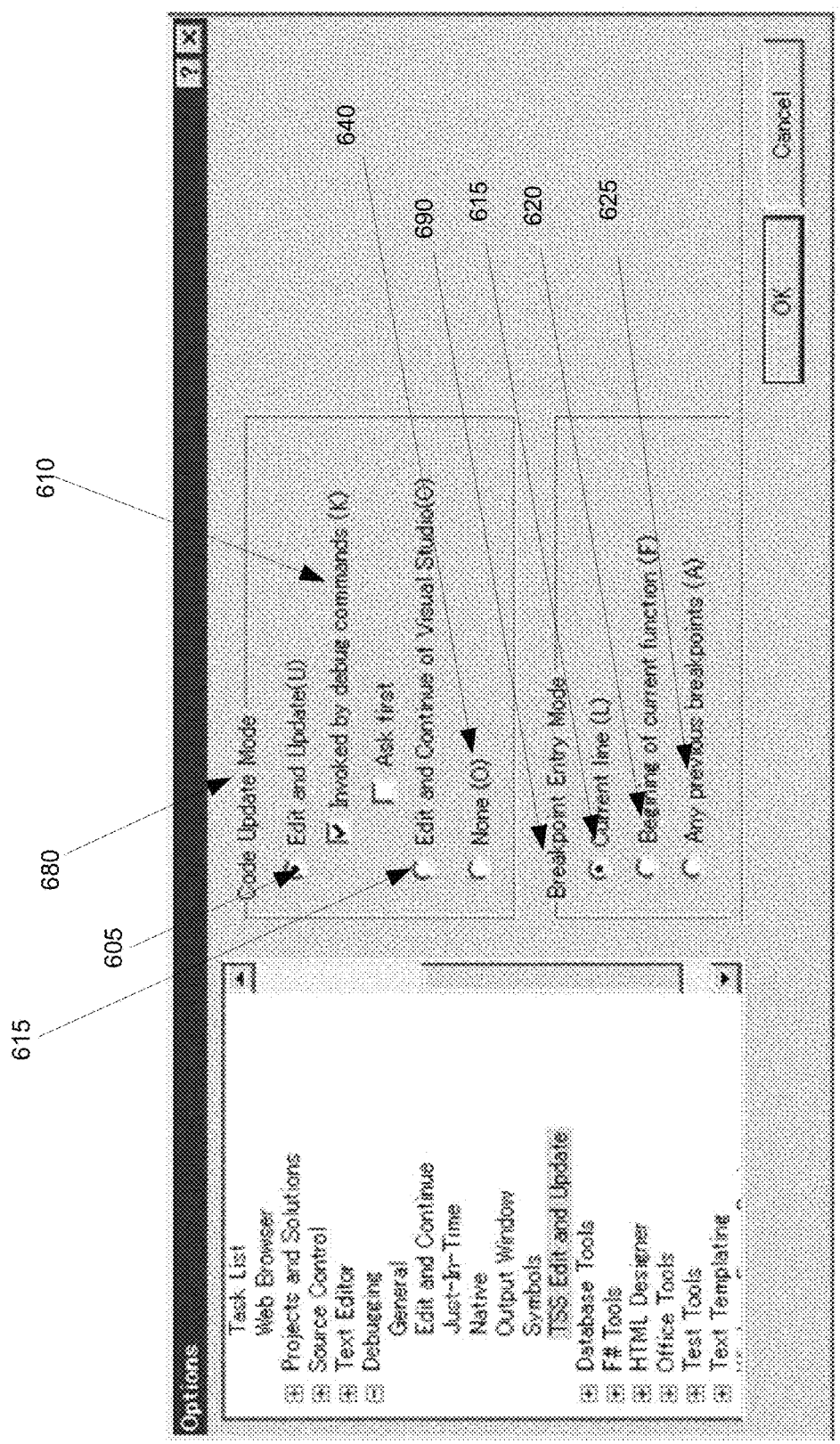
FIG. 6 illustrates an on-screen graphical user interface configuration dialog box to let a user setup various settings for the edit and update functionality in accordance with one embodiment of the present invention.

FIG. 6 illustrates an on-screen graphical user interface configuration dialog box to let a user setup various settings for the edit and update functionality in accordance with one embodiment of the present invention. The radio button group with label Code Update Mode 680 in the configuration dialog box as shown in FIG. 6 can provide three radio buttons to let the user choose between edit and update 605, conventional "edit and continue" 615 or none 640. The none 640 option allows the user to keep debugging edited code when an update is made. Of course, as mentioned above, in circumstances where "edit and continue" cannot be used due to its various limitations, e.g., 64 bit environments, the "edit and continue" radio button will be disabled and thus cannot be selected in such configurations.

In one embodiment, edit and update can be invoked by debug commands by selecting option 610 in the configuration dialog box. This means that edit and update will be automatically invoked whenever the user executes the test class in the development environment using a debug function, e.g., step execution, continuous execution, etc. Stated differently, if there is any code change related to the current test class under debug or its derivative test classes, edit and update will be automatically invoked when the user uses any debug commands to continue test execution.

In one embodiment, the user can also be allowed to select the breakpoint entry mode 690. The breakpoint entry mode allows the user to select the point at which control of debugging is to be returned to the user. If the user selects the current line option 615, a breakpoint to the current line will be added once the debugger is paused and all other breakpoints are temporarily disabled. When the flow item is re-executed, this breakpoint will be hit and control will be given back to the user after re-enabling all the temporarily disabled breakpoints.

If the user selects the beginning of current function option 620, instead of current line, a breakpoint will be added to the opening brace of the function which contains the current line. After the breakpoint is hit at this breakpoint, all other breakpoints that were temporarily disabled at the start of the edit and update session will be enabled.

If the user selects the any previous breakpoints option 625, after the test class is reloaded, all breakpoints that the user set in the previous debug sessions at which edit and update was invoked will be enabled. Also, no additional breakpoints will be added. When the flow item is restarted, since all breakpoints are enabled, if any line containing a breakpoint is executed, execution of the flow item will be paused there.

Figure 7:
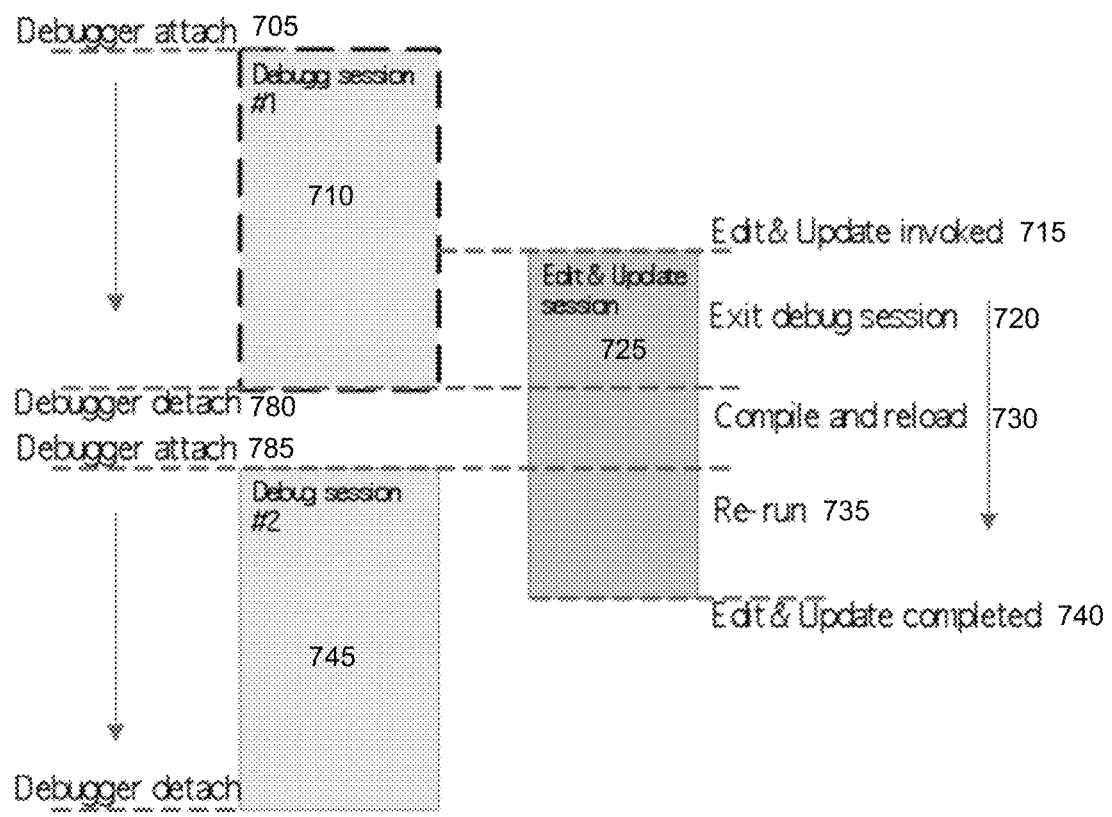
FIG. 7 is a block diagram illustrating the lifecycle of an edit and update session in accordance with one embodiment of the present invention.

As discussed above, an edit and update session can typically be defined to last from the point of time the user selects the edit and update procedure to execute till the point of time when the debugged flow item is about to be re-executed. FIG. 7 is a block diagram illustrating the lifecycle of an edit and update session in accordance with one embodiment of the present invention. As illustrated in FIG. 7, an edit and update session may be overlapped by more than one debug session.

In FIG. 7, the edit and update session 725 is overlapped by two debug sessions, 710 and 745. The test class DLLs are compiled and reloaded between the two debug sessions, 710 and 745. The edit and update session 725 is invoked at step 715 after debug session 710 starts at step 705. The debug session 710 exits at step 720 and detaches from the site controller at step 780. After the debugger detaches, the modified base class and its derivative classes are compiled and reloaded at 730. Following reload, debug session 745 attaches to the site controller at step 785 and the modified base class is re-run at 735 till the breakpoint selected by the user is reached. At that point, the edit and update process is complete at 740 and TSS can resume execution of the test flow. It should be noted that typically the user is allowed to invoke only one edit and update session at any time.

In one embodiment, the test class author is allowed to use the edit and update procedure within flow items which are part of a branch flow within a concurrent flow item. When debugging test class code in configurations where multiple flow items are executing in parallel, all flow executions except the one being debugged will be completed and the next scheduled flow item execution(s) will not be started until the edit and update session has finished. Stated differently, all flow executions that were running in parallel when the debugger hit a breakpoint will be completed first, but no other scheduled flow items will start executing until the edit and update process has finished. Using edit and update for a test class being executed in a concurrent branch will result in the reloading of modified DLLs only after the other branches complete the execution of the entire current flow item.

Figure 8:
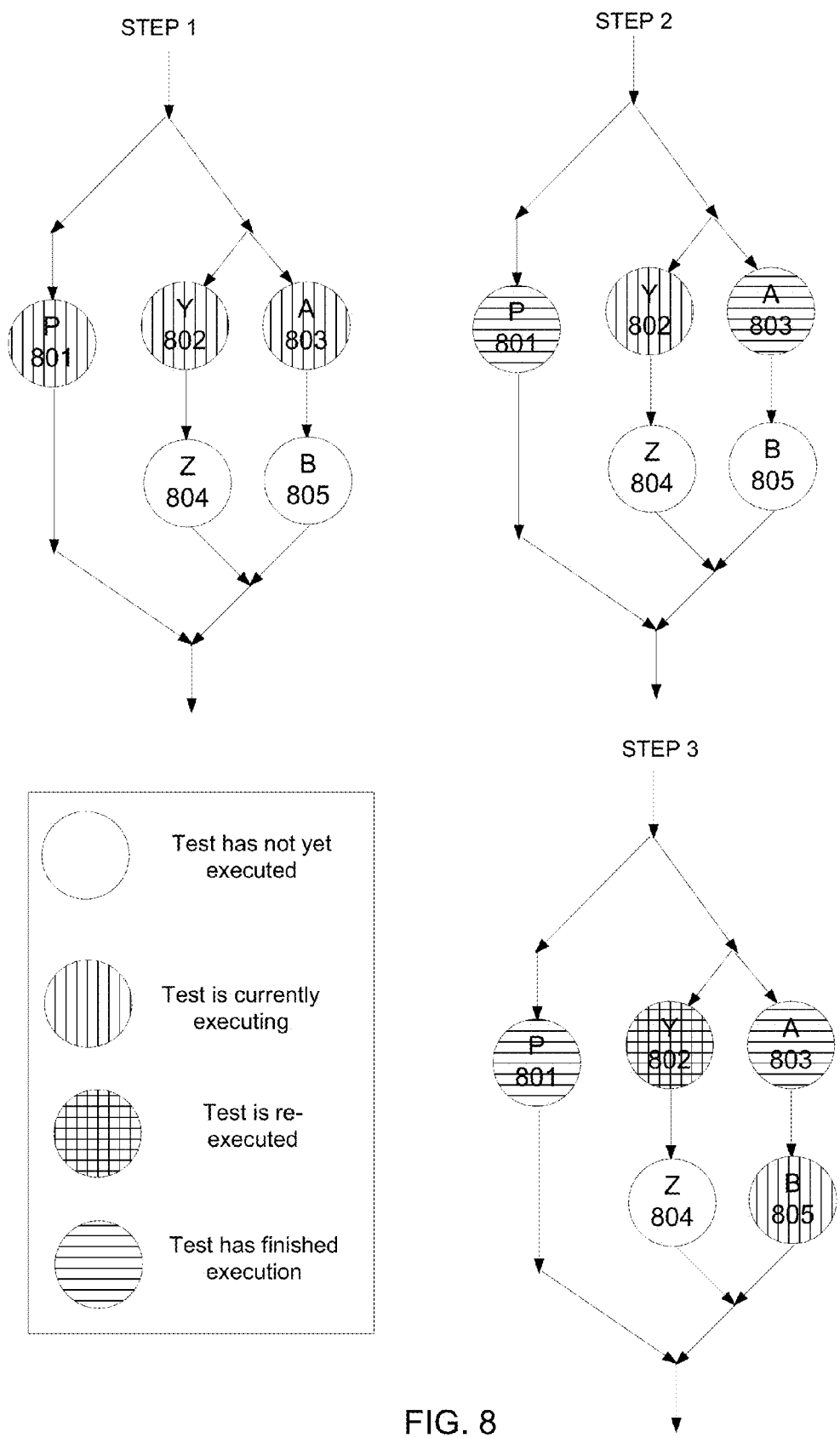
FIG. 8 is a flow diagram illustrating the invocation of the edit and update procedure within a flow item that is part of a branch flow within a concurrent flow item.

FIG. 8 is a flow diagram illustrating the invocation of the edit and update procedure within a flow item that is part of a branch flow within a concurrent flow item. Step 1 in FIG. 8 illustrates a point in time when the user has stopped at a breakpoint in the test class associated with flow item Y 802 while P 801 and A 803 are also paused. The TSS will suspend the flow execution of the Y 802-Z 804 branch being debugged, i.e., the branch in which the breakpoint was encountered, and resume the other concurrent threads which were also paused by the debugger. The other branches (i.e., the P 801 branch and the A 803-B 805 branch) will be allowed to complete the currently executing flow item.

Step 2 in FIG. 8 illustrates the point where P 801 and A 803 have completed execution as a result of the edit and update operation being initiated while Y 802 has not yet completed but is suspended to allow its test class DLL(s) to be rebuilt and reloaded.

Step 3 in FIG. 8 illustrates the point after the edit and update procedure has completed and Y 802 is re-executed while flow item B 805 of the other branch starts executing. In one embodiment, the flow items in the other concurrent branches e.g. P 801 and A 803, are not retested after the unload-compile-reload test class cycle as they were not in the active stack being debugged while the user initiated the edit and update procedure. When the TSS starts to re-execute the flow item which invoked the "edit and update," the TSS will continue execution of these other branches from their respective suspend points.

In one embodiment, the edit and update procedure is configured to handle all error conditions in a safe manner so as to preserve the state of the tester. For example, if the edit and update process is interrupted for any reason, e.g. a compilation error raised when compiling edited test class code, the user might want to continue the edit and update session voluntarily after fixing the compilation errors. Alternatively, the user might want to abort the session if the user realizes that a fix requires the test plan file to be modified and thus requires a reloading of the test plan. Thus, the user is provided the capability to start an edit and update session and either continue or abort an ongoing "edit and continue" session.

If a user decides to abort the edit and update operation and reload the entire test plan, or if the TSS aborts an ongoing session in case an alarm or an unexpected exception is raised, the system state will depend on the time when aborting takes place. For example, if aborting takes place prior to entering suspend state, i.e. where TSS has resumed test plan execution but before all the flow execution branches get suspended, test plan execution will be cancelled and also the edit and update operation will be cancelled. The debugger will still be attached to the site controller in this instance and the older test class DLL will still be loaded. The previously disabled breakpoints will be re-enabled, and in order for the user to debug this test class, the user will need to re-execute the flow item. Similarly, in other circumstances, depending on when the edit and update operation is aborted, the system software is configured to perform all the necessary bookkeeping steps required to maintain a consistent tester state.

Typically, a flow item is started with a set of active DUTs. In one embodiment, the user may either put some DUTs in a hold state or reject some DUTs explicitly in the test class code before invoking edit and update. When the TSS starts to re-execute the flow item, the TSS will put the items on hold back to a measurable DUT state again. Accordingly, when re-executing the flow item, except DUTs that were explicitly rejected by the test class code, the same set of DUTs that were used in the previous execution will be used.

Figure 9:
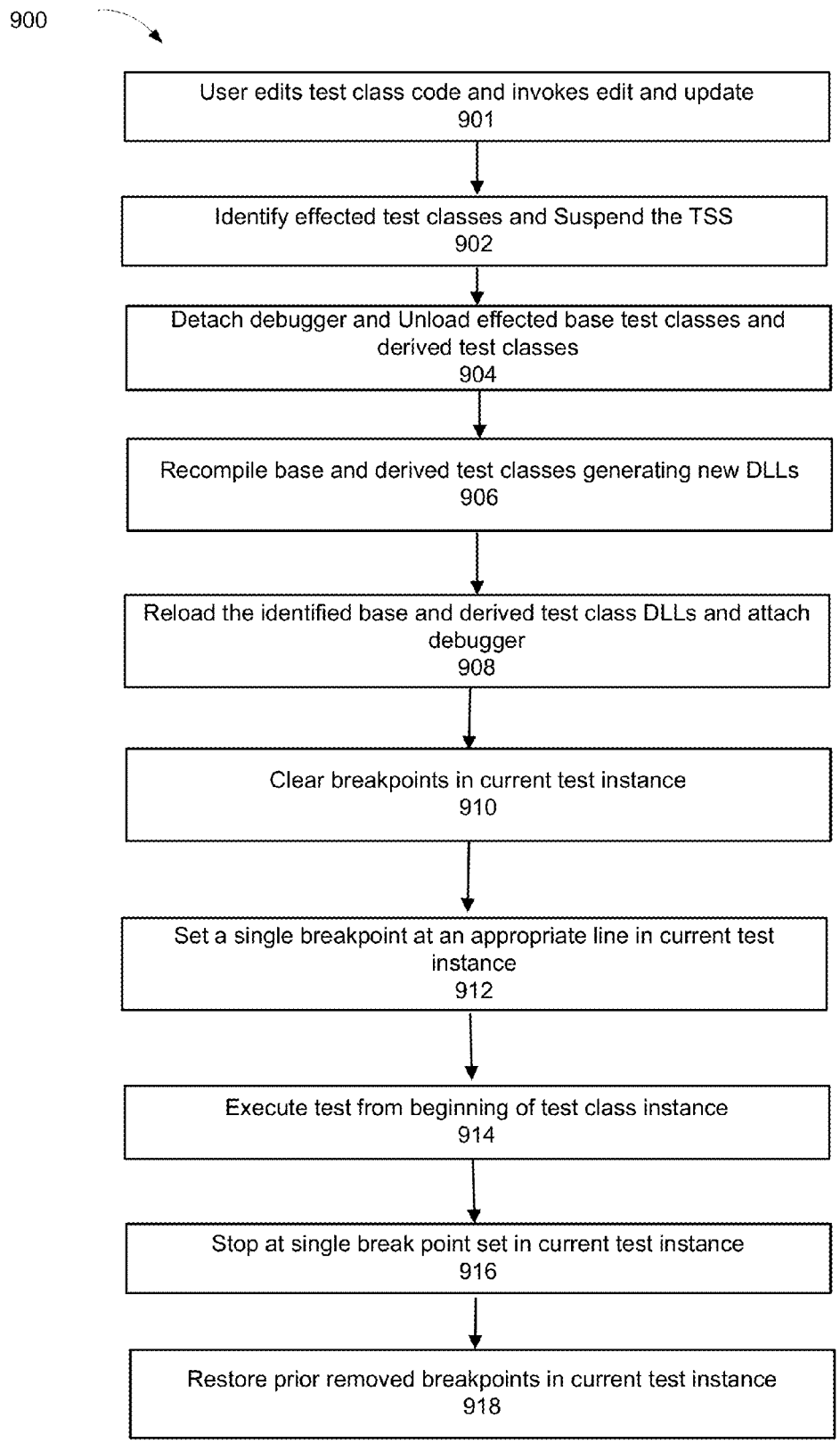
FIG. 9 depicts a flowchart of an exemplary computer controlled process for implementing the edit and update functionality in accordance with one embodiment of the present invention.

FIG. 9 depicts a flowchart 900 of an exemplary computer controlled process for implementing the edit and update functionality in accordance with one embodiment of the present invention.

At step 901, the user edits the test class code and invokes the edit and update procedure.

At step 902, the procedure identifies the base class and all derived test classes that depend from the base test class as discussed in connection with FIG. 5 above. Subsequently, at step 902, the test plan is suspended and the state information is stored. For example, in one embodiment, the state information comprising the line at which the user invoked the edit and update procedure is stored. In one embodiment, the test plan may suspend after finishing execution of the remaining test class from which the edit and update functionality was invoked. In other embodiments, the user can immediately skip out of executing any remaining test class code and suspend execution of the test plan.

At step 904, the debugger detaches from the site controller 270 and the effected base and derived test classes are unloaded.

At step 906, the edit and update procedure saves the source test class files modified in the code window of the development environment and then compiles the test class project to generate one or more new DLLs. The new DLL(s) are transmitted down from system controller 201 to site controller 270. In addition to the DLL for the base test class that was modified, DLLs for the derived test classes will also need to be generated and transmitted to the site controller 270.

If the test class project compiles successfully, the updated test class DLL will be reloaded back at step 908 and the debugger is attached back to the same site controller that was being debugged in the prior debug session. Reloading the test class DLL comprises populating the test instances of the test class being debugged using the new test class DLL and with the same test parameter values that were set originally. In addition, it also means populating the instances of all the derived test classes as well.

At step 910, the edit and update procedure, in one embodiment, disables temporarily all the breakpoints that were used in the previous debug session so the user can be returned to the current line in the code or in the vicinity of the code where the edit and update process was invoked. At step 912, the procedure will set a breakpoint at the "current line" at which the instruction pointer was paused when the edit and update procedure was initiated. In different embodiments, other ways to control the breakpoint that the user is returned to may be provided as detailed above.

Subsequently, the flow item associated with the updated test class is re-executed by TSS at step 914 from the beginning of the test class instance. At step 916, the execution will break within the debugger at the current line or other location that the user previously elected to return to through the breakpoint entry mode choice 690. At step 918, the edit and update procedure will then restore all the temporarily disabled breakpoints that had been set by the user. Thereafter, the edit and update process ends.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer implemented method for debugging test procedures for automated device testing, said method comprising: receiving a command to update and invoke modifications made to at least one modified test procedure, wherein said at least one modified test procedure is modified during a first debugging session;
   saving state information for a test plan, wherein said state information comprises information regarding a breakpoint entry location, wherein said modified test procedure is invoked within said test plan, wherein said test plan is operable to execute on a site controller connected to plurality of devices under test (DUT), and wherein said test plan comprises a sequence of tests operable to be applied said plurality of DUTs coupled to automated test equipment, and wherein each test procedure is operable to implement a type of test applied to said plurality of DUTs; suspending execution of said test plan;
   unloading said modified test procedure from said test plan, wherein said unloading comprises detaching a debugger executing said first debugging session from said site controller;
   compiling said modified test procedure to produce a compiled file associated with said modified test procedure;
   reloading said modified test procedure into said test plan using said compiled file, wherein said reloading comprises attaching said debugger to said site controller and wherein said reloading further comprises transferring said compiled file from a system controller to said site controller, wherein said system controller is communicatively coupled to said site controller and wherein said system controller controls said site controller and instantiating test instances associated with said modified test procedure in said test plan using said compiled file;
   resuming execution of said modified test procedure and said test plan in a second debugging session; and
   breaking said execution during said second debugging session at a breakpoint corresponding to said breakpoint entry location,
   wherein said saving, said suspending, said unloading, said compiling, said reloading, said resuming and said breaking occur automatically in response to said receiving.

2. The method of claim 1, wherein said resuming further comprises: clearing prior breakpoints set during said first debugging session;
   setting a breakpoint in said modified test procedure corresponding to said breakpoint entry location; and
   restoring said prior breakpoints after execution breaks during said second debugging session at said breakpoint corresponding to said breakpoint entry location.

3. The method of claim 1, wherein said reloading further comprises:
   populating said test instances in said test plan with parameter values originally set during said first debugging session.

4. The method of claim 1, wherein said modified test procedure comprises a base test procedure and at least one derived test procedure that depends from said base test procedure.

5. The method of claim 4, further comprising:
   identifying said at least one derived test procedure that depends from said base test procedure before said unloading.

6. The method of claim 1, further comprising:
   executing said modified test procedure to completion prior to said suspending.

7. The method of claim 1, wherein said breakpoint entry location is selected from the group comprising: a current line, beginning of a current function, and any prior breakpoints.

8. The method of claim 1, further comprising:
   executing said test plan to completion from said breakpoint corresponding to said breakpoint entry location during said second debugging session.

9. The method of claim 1, further comprising:
   invoking said command to update said modified test procedure automatically when said modified test procedure is modified and a debug command is executed.

10. The method of claim 1, further comprising: determining if test procedures are running in parallel to said modified test procedure in concurrently executing branch flow items;
    executing said test procedures running in parallel to completion while said modified test procedure is in a suspended state following said suspending; and
    suspending execution of further test procedures in said concurrently executing branch flow items while said modified test procedure is executing.

11. A non-transitory computer-readable storage medium having stored thereon, computer executable instructions that, if executed by a computer system cause the computer system to perform a computer implemented method for debugging test procedures for automated device testing, said method comprising:

receiving a command to update and invoke modifications made to at least one modified test procedure, wherein said at least one modified test procedure is modified during a first debugging session;

saving state information for a test plan, wherein said state information comprises information regarding a breakpoint entry location, wherein said modified test procedure is invoked within said test plan, wherein said test plan is operable to execute on a site controller connected to plurality of devices under test (DUT), and wherein said test plan comprises a sequence of tests operable to be applied said plurality of DUTs coupled to automated test equipment, and wherein each test procedure is operable to implement a type of test applied to said plurality of DUTs; suspending execution of said test plan;

unloading said modified test procedure from said test plan, wherein said unloading comprises detaching a debugger executing said first debugging session from said site controller;

compiling said modified test procedure to produce a compiled file associated with said modified test procedure;

reloading said modified test procedure into said test plan using said compiled file, wherein said reloading comprises attaching said debugger to said site controller and wherein said reloading further comprises transferring said compiled file from a system controller to said site controller, wherein said system controller is communicatively coupled to said site controller and wherein said system controller controls said site controller and instantiating test instances associated with said modified test procedure in said test plan using said compiled file;

resuming execution of said modified test procedure and said test plan in a second debugging session; and breaking said execution during said second debugging session at a breakpoint corresponding to said breakpoint entry location, wherein said saving, said suspending, said unloading, said compiling, said reloading, said resuming and said breaking occur automatically in response to said receiving.

12. The non-transitory computer-readable storage medium as described in claim 11, wherein said method further comprises:

clearing prior breakpoints set during said first debugging session;

setting a breakpoint in said modified test procedure corresponding to said breakpoint entry location; and restoring said prior breakpoints after execution breaks during said second debugging session at said breakpoint corresponding to said breakpoint entry location.

13. The non-transitory computer-readable storage medium as described in claim 11, wherein said method further comprises:

populating said test instances in said test plan with parameter values originally set during said first debugging session.

14. The non-transitory computer-readable storage medium as described in claim 11, wherein said modified test procedure comprises a base test procedure and at least one derived test procedure that depends from said base test procedure.

15. The non-transitory computer-readable storage medium as described in claim 14, wherein said method further comprises:

identifying said at least one derived test procedure that depends from said base test procedure before said unloading.

16. The non-transitory computer-readable storage medium as described in claim 11, wherein said method further comprises:

executing said modified test procedure to completion prior to said suspending.

17. The non-transitory computer-readable storage medium as described in claim 11, wherein said breakpoint entry location is selected from the group comprising: a current line, beginning of a current function, and any prior breakpoints.

18. The non-transitory computer-readable storage medium as described in claim 11, wherein said method further comprises:

executing said test plan to completion from said breakpoint corresponding to said breakpoint entry location during said second debugging session.

19. The non-transitory computer-readable storage medium as described in claim 11, wherein said method further comprises:

invoking said command to update said modified test procedure automatically when said modified test procedure is modified and a debug command is executed.

20. The non-transitory computer-readable storage medium as described in claim 11, wherein said method further comprises:

determining if test procedures are running in parallel to said modified test procedure in concurrently executing branch flow items;

executing said test procedures running in parallel to completion while said modified test procedure is in a suspended state following said suspending; and suspending execution of further test procedures in said concurrently executing branch flow items while said modified test procedure is executing.

21. A system for debugging test procedures for automated device testing, said system comprising:

a memory comprising a development environment stored therein, wherein said development environment is operable to debug a test program, and wherein said development environment comprises a debugger;

a processor coupled to the memory, the processor being configured to operate in accordance with the development environment to receive a command to update and invoke modifications made to at least one modified test procedure, wherein said at least one modified test procedure is modified during a first debugging session and in response to said receiving, the processor being further configured to automatically perform the following:

save state information for a test plan, wherein said state information comprises information regarding a breakpoint entry location, wherein a said modified test procedure is invoked within said test plan, wherein said test plan is operable to execute on a site controller connected to plurality of devices under test (DUT), and wherein said test plan comprises a sequence of tests operable to be applied said plurality of DUTs coupled to automated test equipment, and wherein each test procedure is operable to implement a type of test applied to said plurality of DUTs;

suspend execution of said test plan;

unload said modified test procedure from said test plan and detach a debugger executing said first debugging session from said site controller;

compile said modified test procedure, wherein said compile generates a compiled file associated with said modified test procedure;

reload said modified test procedure into said test plan using said compiled file and attach said debugger to said site controller, wherein said reloading further comprises transferring said compiled file from a system controller to said site controller, wherein said system controller is communicatively coupled to said site controller and wherein said system controller controls said site controller and instantiating test instances associated with said modified test procedure in said test plan using said compiled file;

resume execution of said modified test procedure and said test plan in a debugging session; and break said execution during said debugging session at a breakpoint corresponding to said breakpoint entry location, wherein said saving, said suspending, said unloading, said compiling, said reloading, said resuming and said breaking occur automatically in response to said receiving.

\* \* \* \* \*